Sept. 15, 1959 C. F. CARLZEN ET AL 2,903,697
AUTOMATIC ASSEMBLY APPARATUS
Filed July 13, 1954 5 Sheets-Sheet 1

INVENTORS.
Carl F. Carlzen
BY William L. Zehner
Mason, Kolehmainen, Rathburn & Wyss
Attys.

Sept. 15, 1959 — C. F. CARLZEN ET AL — 2,903,697
AUTOMATIC ASSEMBLY APPARATUS
Filed July 13, 1954 — 5 Sheets-Sheet 2

INVENTORS.
Carl F. Carlzen
BY William L. Lehner
Mason, Kolehmainen, Rathburn & Wyss
Attys

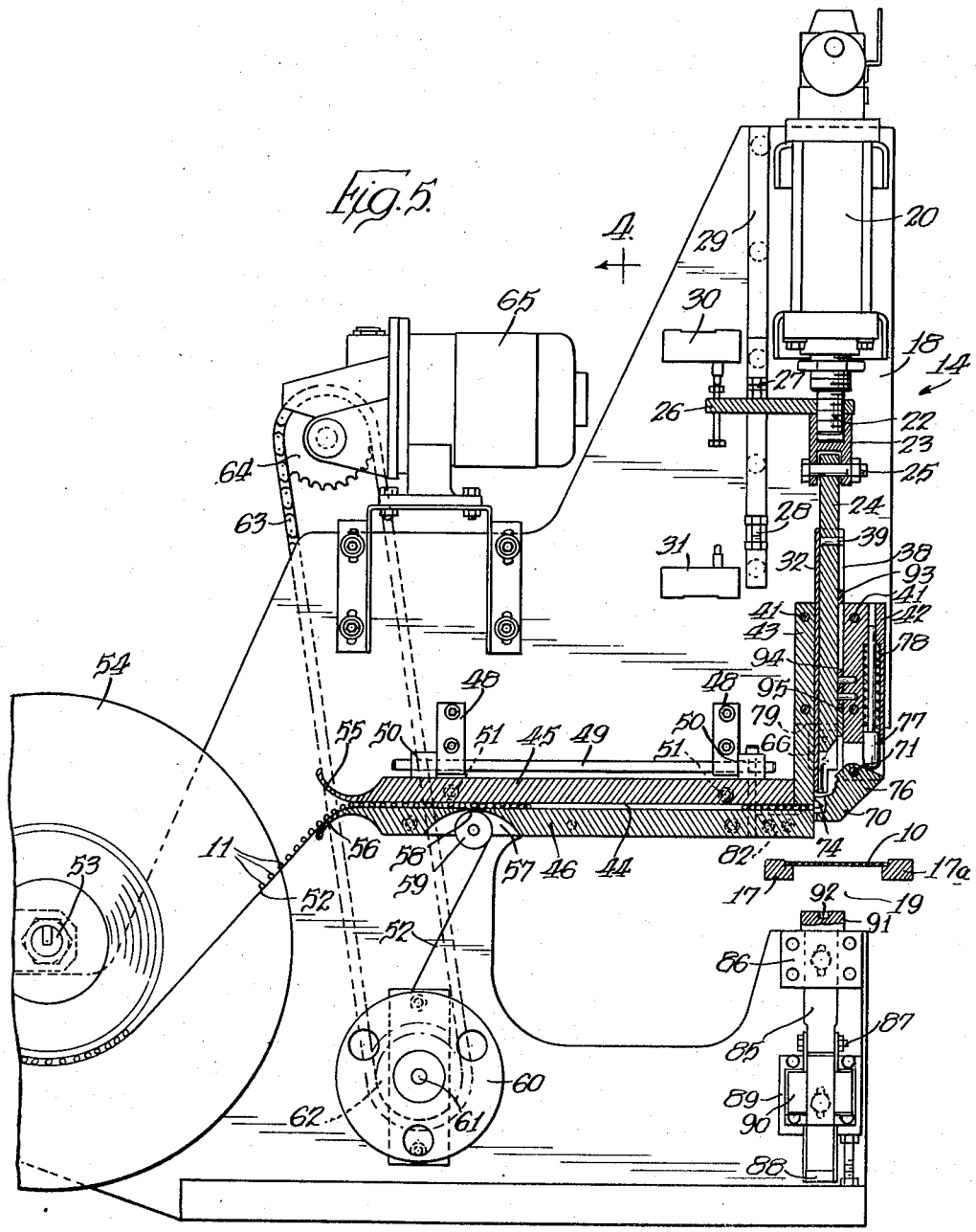

Sept. 15, 1959  C. F. CARLZEN ET AL  2,903,697
AUTOMATIC ASSEMBLY APPARATUS
Filed July 13, 1954  5 Sheets-Sheet 4
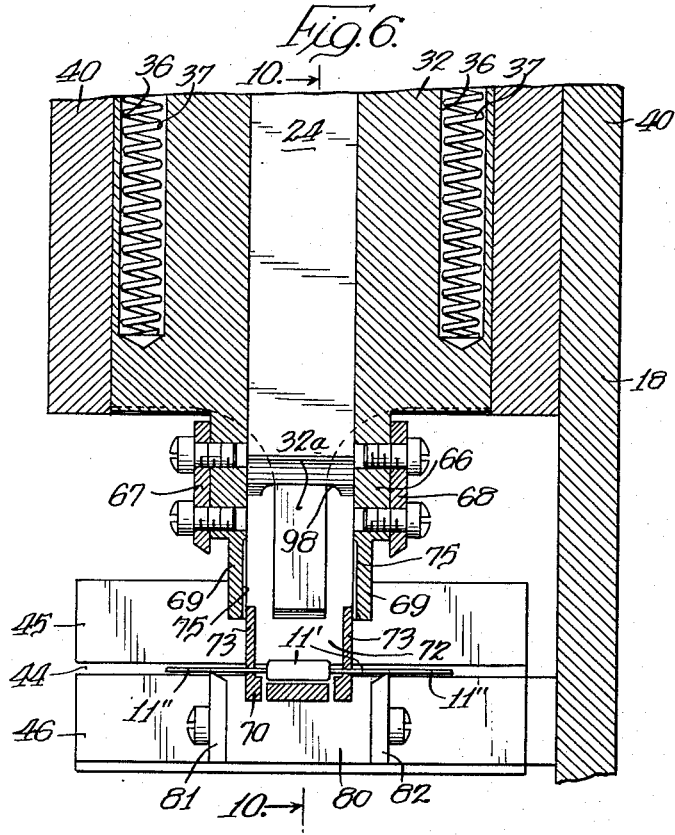
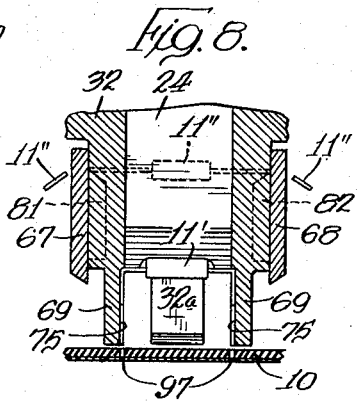
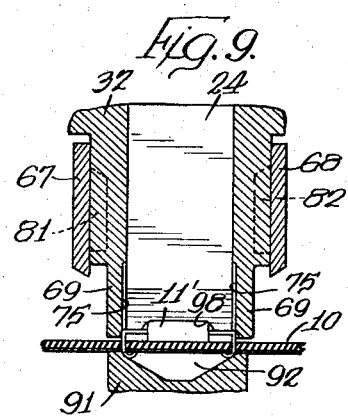
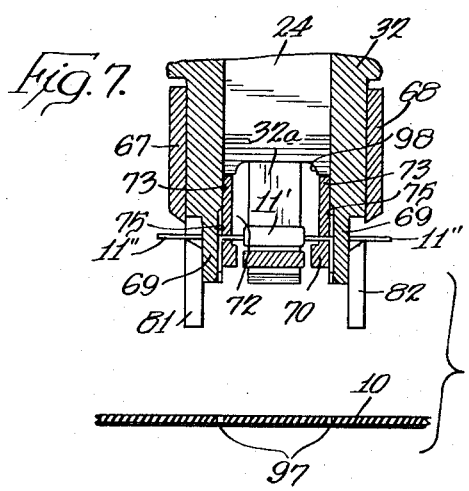
INVENTORS.
Carl F. Carlzen
BY William L. Lehner
Mason, Kolehmainen, Rathburn & Wyss
Attys.

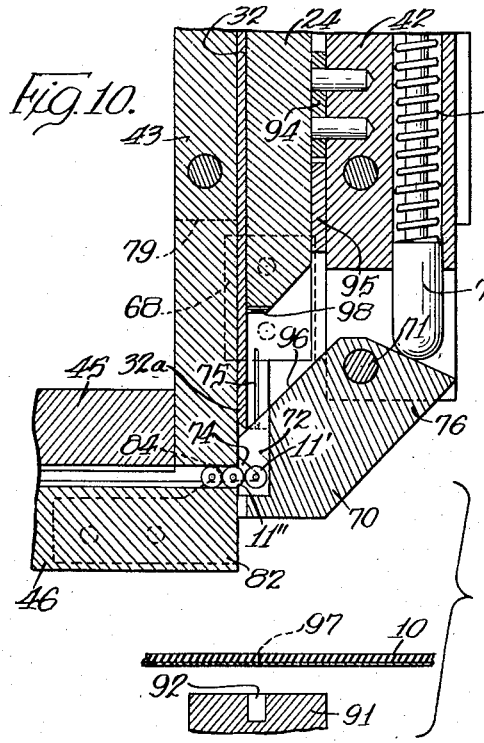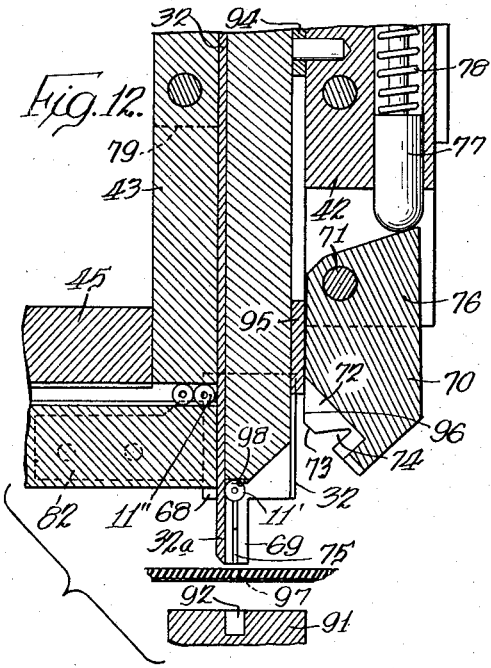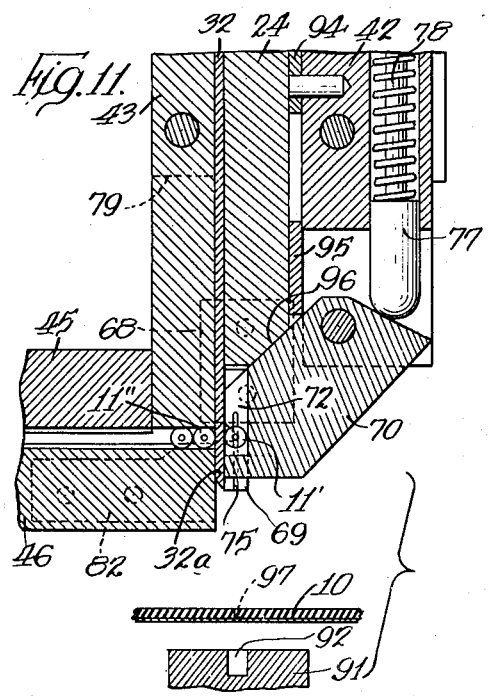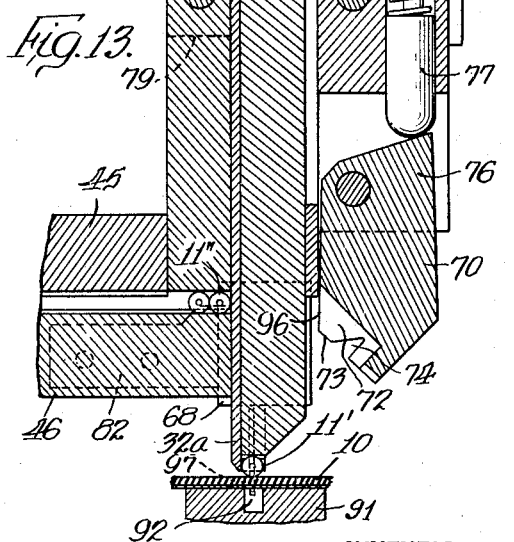

United States Patent Office 2,903,697
Patented Sept. 15, 1959

2,903,697

AUTOMATIC ASSEMBLY APPARATUS

Carl F. Carlzen, Buffalo, and William L. Lehner, Snyder, N.Y., assignors, by mesne assignments, to Sylvania Electric Products, Inc., Wilmington, Del., a corporation of Delaware Application July 13, 1954, Serial No. 443,012

7 Claims. (Cl. 1—2)

This invention relates to automatic assembly apparatus, more particularly, to apparatus for automatically positioning and securing in predetermined relation upon suitable insulating baseboards or baseplates certain of the components employed in the manufacture of radio and television receivers or similar electrical and electronic devices, and the invention has for an object the provision of simple, reliable and fully automatic apparatus of this character.

The mechanization of factories and particularly the mechanization of production lines, which presently require the performance of numerous and precise manual operations, has recently become of increasing importance because of the necessity of reducing costs while maintaining or even improving quality, and numerous proposals have been advanced and are being advanced looking toward the provision of automatic machinery for completely, or at least partially, mechanizing such production lines. This is particularly true in connection with the manufacture of electronic apparatus such, for example, as radio and television receivers in which a large number of components, i.e., resistors, condensers, tube sockets, transformers and the like must be assembled on a base or panel and connected together in the desired circuit relationships.

In most radio and television receivers, for example, the number of resistors and condensers employed usually constitutes a major portion, from the numerical standpoint, of the desired components, and the majority of these resistors and condensers are usually in the form of an elongate body portion having lead wires extending axially from the ends of the body portion and adapted to be electrically connected to appropriate conductors so as to complete the desired electrical circuits. Numerous problems arise in connection with the manipulation of such components to insure that the leads are of the proper length and are securely connected to the other electrical circuit components so as to support these resistors and condensers in suitable positions and in suitable circuit relation.

With the advent of improvements in so-called printed circuit techniques it has been found advantageous, where permitted by the circuitry, to print or otherwise suitably form the circuit connections upon one side of an insulating baseboard or panel and to mount the various components on the opposite side of the baseboard with appropriate connecting leads therefrom extending through the baseboard and electrically connected with the printed circuit. It is a further object of the present invention, therefore, to provide automatic apparatus for assembling any desired number of resistors, condensers or similar components on a suitable baseboard with the conducting leads from the components extending through the baseboard at desired locations so as to permit proper electrical connection of the components in the circuit, and to secure the components on the base.

In carrying out the invention in one form an apparatus is provided which includes an assembly station adapted to receive suitable baseboards, either with or without a printed circuit thereon, together with means for sequentially feeding to the assembly station components such as resistors or condensers having a body portion from which suitable lead conductors extend. The assembly station includes a cutting station and a forming station disposed in side-by-side relation whereby the forming station receives the leading one and the cutting station receives the second one of the components from the feeding means, and reciprocatable means common to the cutting and forming stations are provided which are effective upon movement from a retracted to an extended position to cut to a desired length the leads on the component in the cutting station and to bend the end portions of the leads on the component in the forming station at substantially a right angle and to thereafter displace the formed component from the forming station so as to move this component to a position in which the right angular portions of the lead conductors extend through a baseboard positioned adjacent the assembly station. Clinching means are also provided disposed on the opposite side of the baseboard from the reciprocatable forming means and operable in timed relation therewith for clinching the extending ends of the leads to secure the component to the baseboard. The feeding means for supplying the components to the assembly station is effective upon return of the reciprocatable means to its retracted position to advance the second component from the cutting station to the forming station and to advance the next successive component to the cutting station whereupon the operation is automatically repeated.

Preferably the feeding means for automatically supplying the components to the cutting and forming stations includes a guide track having spaced apart guide members, the juxtaposed walls of which are shaped to receive the components therebetween with the lead conductors extending laterally of the track. The discharge end of the track is disposed at the assembly station and means are provided for supplying to the opposite end of the guide track a flexible tape having a plurality of the desired components removably secured thereto in parallel laterally extending relation. Intermediate the ends of the guide track, means are provided for stripping the tape from the components and withdrawing the tape from the guide track whereby the stripped components are caused to move through the portion of the guide track between the stripping means and the discharge end of the track by virtue of the pressure exerted thereon by subsequently stripped components and tension means are provided for advancing the tape over the stripping and withdrawing means so as to maintain the desired pressure on the stripped components and effect proper feeding of the components to the assembly station.

For a more complete understanding of the invention reference should now be had to the drawings in which:

Fig. 5 is a side elevational view partly in section, the section being taken along the line 5—5 of Fig. 3;

Fig. 6 is a fragmentary detail view partially in section, on a larger scale, showing the various parts in one operating position;

Fig. 7 is a fragmentary detail view showing some of the parts illustrated in Fig. 6 in a second operating position;

Figs. 8 and 9 are views similar to Fig. 7 showing still further operating positions;

Fig. 10 is a fragmentary detail sectional view taken substantially along the line 10—10 of Fig. 6; and Figs. 11, 12 and 13 are views similar to Fig. 10, but showing the various parts in the respective positions illustrated in Figs. 7, 8 and 9.

Figure 2:
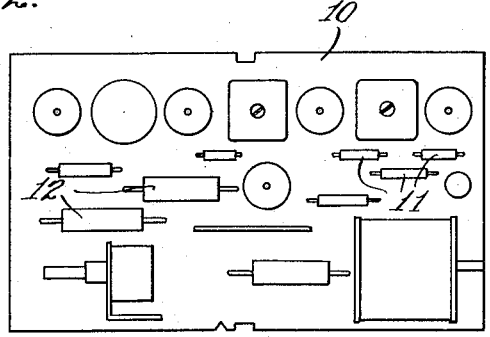
Fig. 2 is a top plan view of a typical chassis for a small radio receiver including a base member on which are supported components that may be automatically mounted thereon in accordance with the present invention.
Figure 2A:
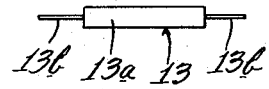
Fig. 2(a) illustrates the type of component to which the present invention relates.

Referring first to Fig. 2 of the drawings there is shown, solely for purposes of illustration, a conventional chassis for a small radio receiver which comprises a suitable insulating baseboard or panel 10 upon which are mounted various electrical components including a plurality of resistors 11, a plurality of condensers 12 and the usual tubes, transformers, etc. The resistors 11 and 12 are of the type which include elongate body portions from the opposite ends of which extend suitable lead conductors. A typical component 13 which may be either a condenser or a resistor is shown in Fig. 2(a) as comprising a body portion 13a and axially extending lead conductors 13b.

In accordance with the present invention resistors and condensers of this type are positioned on the baseboard or panel by first trimming the conductor leads to the proper length, then bending the end portions of the leads to substantially a right angle, inserting the leads through suitably positioned apertures in the baseboard and finally clinching the extending ends of the leads so as securely to fasten the component to the baseboard as is clearly shown in Fig. 9. Subsequently, the desired circuit connections are completed by soldering the clinched ends of the leads as well as the extending ends of the appropriate leads from various other components either to properly positioned printed circuits (not shown) on the opposite side of the baseboard 10 or to other suitable conductors. In accordance with the present invention the trimming, forming, inserting and clinching operations are accomplished automatically in a simple and reliable single operation.

Figure 1:
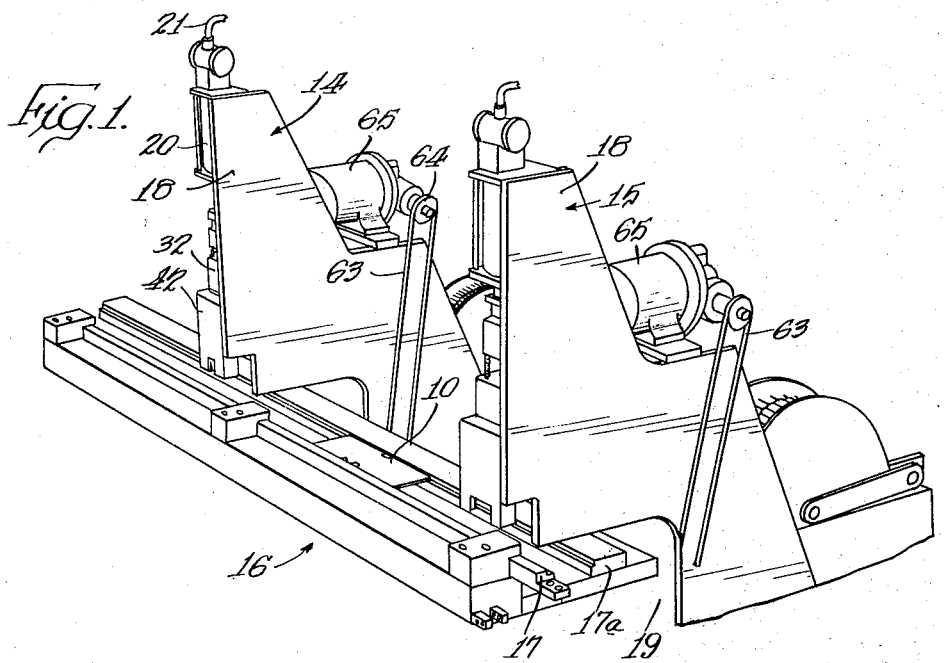
Fig. 1 is a perspective view of a portion of an automatic assembly line incorporating a pair of component assembly mechanisms embodying the present invention.

Referring now to Fig. 1 of the drawings, an automatic resistor assembling mechanism 14 and an automatic condenser assembling mechanism 15 embodying the present invention are shown in association with a suitable transfer mechanism 16 which forms no part of the present invention, but which functions to feed suitable baseboards, one of which is indicated in Fig. 1 by the reference numeral 10, to the mechanisms 14 and 15 for the automatic assembly of components thereon. While any suitable transformer mechanism may be employed or, in fact, in a partially automatic operation the baseboards may be fed to the mechanisms 14 and 15 by hand, the mechanism 16 is shown diagrammatically in Fig. 1 as being of the type described and broadly claimed in a co-pending application Serial No. 454,964, filed September 9, 1954, in the names of the present inventors which application is assigned to the same assignee as the present invention. For the purposes of the present description, it is sufficient to state that the transfer mechanism 16 includes a pair of track members 17 and 17a for supporting the edges of the boards 10 and automatic means are provided for effecting step-by-step movement of the boards along the tracks so as sequentially to bring each board into a proper position with respect to each of the assembly mechanisms 14 and 15 as well as any other assembly mechanisms which may be disposed along the track. Since the assembly mechanisms 14 and 15 are identical except for the size, spacing, and proportions of some of the parts, only the resistor assembly mechanism 14 will be described in detail.

As shown best in Figs. 1 and 3 to 5, inclusive, of the drawings, the assembly mechanism 14 comprises a main mounting plate 18 upon which all of the operating, supporting and guiding elements are mounted, the plate 18 having an opening 19 therein, as shown best in Figs. 1 and 5 to permit the track members 17 and 17a to pass therethrough intermediate the upper and lower portions of the mounting plate. By reason of this arrangement it will be apparent that the mechanisms 14 and 15, for example, may be adjusted longitudinally, laterally or angularly of the track members 17 and 17a so as to permit assembly of the particular component handled by the particular assembly mechanism at any desired position on the boards 10. Furthermore, additional mechanisms similar to the assembly mechanisms 14 and 15 may be positioned as desired on either or both sides of the track members 17 and 17a so as to conserve space and permit the simultaneous insertion of a plurality of components into a single board if desired.

Suitably supported adjacent the front upper end of the mounting plate 18 is a reciprocating pneumatic motor 20 which may be of a type well known in the art and which serves to operate the reciprocatable members, to be hereinafter described, which perform the component assembly operations. It is not believed necessary to describe the air motor 20 in detail further than to point out that it is provided with a suitable air supply conduit 21 and with suitable valves for controlling the air supply, which valves may be operated either electrically or pneumatically. It will be understood, of course, that the present invention is not limited to the use of a reciprocating air engine but that any suitable electric, hydraulic or mechanical reciprocating power element may be employed. Extending from the lower end of the engine 20 is an operating plunger or rod 22 which is threadedly connected to a bifurcated connector 23 which carries a reciprocatable ejecting member 24 that is secured to the connector by means of a suitable pin 25. Also carried by the plunger 22 is an angularly extending control and stop arm 26 which is adapted to engage a pair of spaced apart adjustable stop members 27 and 28 carried by a suitable bracket 29 secured to and extending outwardly from the mounting plate 18. The stop members 27 and 28 serve positively to limit the reciprocating movement of the plunger 22 and a pair of control switches 30 and 31 are mounted on the mounting plate 18 in position to be operated by the arm 26 when the plunger 22 occupies its uppermost and its lowermost positions respectively. Slidingly carried by the ejecting member 24 for operation therewith during an initial portion of the operating cycle is a forming member 32 having a vertical slot therein through which the ejecting member 24 slides. In order to provide a proper driving connection between the ejecting member 24 and the forming member 32, the ejecting member is provided, as shown best in Fig. 3, with laterally extending portions 33 and 34 which are apertured, as shown, for receiving a pair of adjustable pusher members 35 which extend into suitable apertures 36 in the forming member 32 and engage the upper ends of suitable compression springs 37 located in the apertures 36. The strength of the springs 37 is such that during an initial portion of the downward stroke of the ejecting member 24, the forming member will be driven with the member 24 through the springs 37 but after the forming member 32 encounters a suitable stop, to be hereinafter described, the ejecting member 24 will continue to travel downwardly independently of the forming member 32 and the springs 37 will be compressed. In order to permit such relative movement the forming member 32 is provided with an elongate slot 38 for receiving the extending end of a pin 39 carried by the forming member 24, the pin and slot thus providing a lost-motion connection.

Immediately above the opening 19, the mounting plate 18 is provided with guide block means for slidably guiding the forming member 32 and the ejecting member 24 during their reciprocating movement, which guide block means comprises a pair of spaced apart side plates 40 secured to the mounting plate 18 by fastening means 41 which extend through a suitable front plate 42 and a rear plate 43 so as to form a substantially rectangular guide block. As will be more fully explained hereinafter, means are provided adjacent the lower end of the guide block means for cooperation with the reciprocatable forming member 32 and ejecting member 24 to provide side-by-side cutting stations and forming stations and in order properly to feed the resistors 11 to these stations feeding means are provided in the form of a guide track 44 which comprises an upper guide member 45 and a lower guide member 46 which are secured to and extend laterally of the mounting plate 18 and which provide a guide track having its discharge end disposed immediately below the above-described guide block means.

Figure 4:
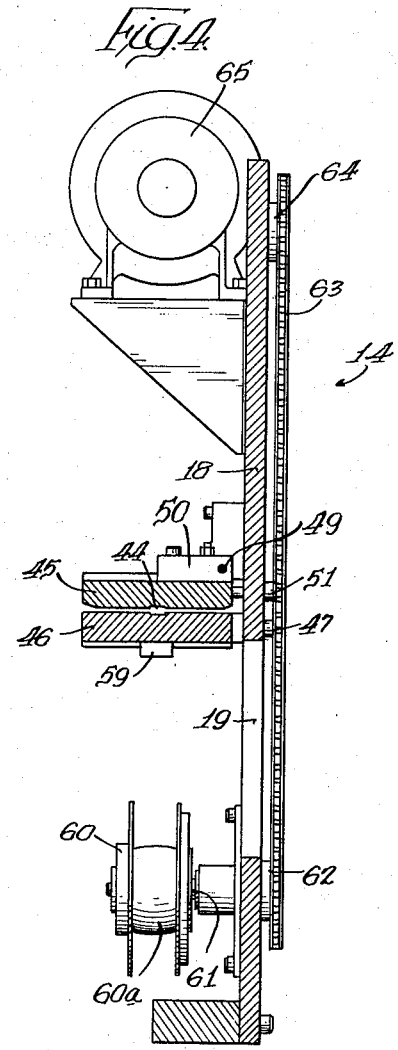
Fig. 4 is an elevational sectional view of the rear portion of the mechanism shown in Fig. 3, the section being taken substantially along the line 4—4 of Fig. 5 and certain parts being omitted for clarity.

As shown best in Fig. 4, the lower track member 46 is rigidly secured to mounting plate 18 by suitable fastening means 47, while the upper guide track 45 is mounted for swinging movement on adjustable means which comprise a pair of blocks 48 secured to the mounting plate 18 and adapted to carry a pivot rod 49 which extends through suitable bearing members 50 disposed adjacent opposite ends of the track member 45. A pair of adjusting members 51 (Fig. 4 and Fig. 5) extend through the mounting plate 18 for engagement with one edge of the track member 45 so as to permit adjustment and alignment of the track member 45 with the track member 46 while at the same time permitting the track member 45 to be swung upwardly to provide ready access to the guide track 44.

As best shown in Fig. 4, the juxtaposed upper and lower surfaces of the track members 46 and 45, respectively, are shaped to provide the guide track 44 with an enlarged central portion for receiving the body portion of the resistors 11 and somewhat narrower laterally extending portions for receiving the extending leads of the resistors. In order to provide for proper feeding of the resistors to and through the guide track 44 the resistors are supplied to the guide track in the form of a flexible belt which comprises a tape 52 to which the resistors are removably, preferably adhesively, secured in laterally aligned relation.

As shown in Fig. 5 the mounting plate 18 is provided adjacent its rear end with a shaft 53 on which is mounted a supply drum 54 containing a roll of tape-mounted resistors. Although suitable rolls of tape-mounted resistors may be available on the market, such rolls may be produced, if not so available, in accordance with the apparatus and procedures described and claimed in a co-pending application Serial No. 418,670, filed March 25, 1954 entitled, "Article Handling Apparatus," now United States Letters Patent 2,779,385 issued January 29, 1957, which patent is assigned to the same assignee as the present invention.

As shown in Fig. 5, the upper track member 45 and the lower track member 46 are provided at their rear ends with flared portions 55 and 56 respectively which serve to guide the tape 52 carrying the resistors 11 into the guide track. Intermediate its ends the guide track 46 is provided with a centrally disposed arcuate cut away portion 57 which extends entirely through the track member 46 to provide a narrow tape receiving slot 58 and immediately below the slot 58 is journalled a stripping roller 59 about which the tape 52 is adapted to pass to a take-up drum 60. It will be apparent that when the tape 52 is threaded, as shown, through the slot 58 and over the take-up roller 59, rotation of the take-up drum 60 will cause the tape 52 to be stripped from the resistors 11 as the resistors pass over the slot 58 and that as succeeding resistors are stripped from the tape the stripped resistors will be advanced through the guide track 44 to the discharge end thereof by reason of the pressure exerted on each resistor by the next succeeding resistor. In order to insure that the resistors are fed to the discharge end of the track under suitable pressure the take-up drum 60 is provided with a suitable conventional friction-type slip clutch preferably located within the hub 60a of the drum and adapted to be driven from a suitable shaft 61 journalled in the mounting plate 18 which shaft carries a suitable sprocket 62 adapted to be driven by a chain 63 from a similar sprocket 64 that is in turn driven by an electric motor 65 mounted adjacent the upper end of the mounting plate 18.

Figure 3:
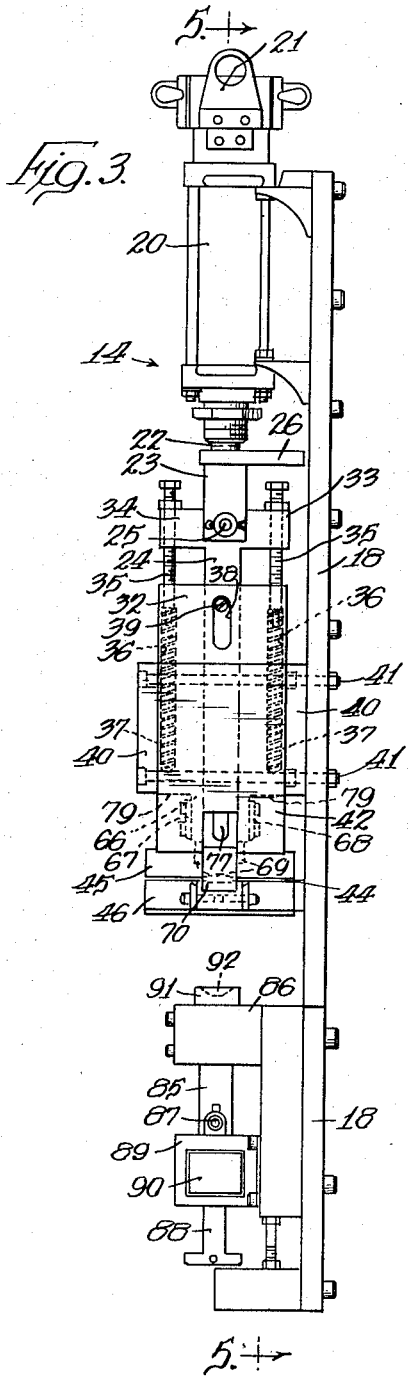
Fig. 3 is a front elevational view of one of the automatic assembly mechanisms shown in Fig. 1.

Turning now to the previously referred to cutting and forming stations disposed at the forward or discharge end of the guide track 44 it will be seen, as shown best in Figs. 3 and 6, that the forming member 32 is provided at its lower end with a portion 66 of reduced width for supporting on the opposite sides thereof a pair of rearwardly extending upper cutting knives 67 and 68, and a pair of spaced apart forming or bending fingers 69 extend downwardly from the portion 66. As shown best in Fig. 6, the rear wall of the forming member 32 is provided at its lower edge with a narrow tongue portion 32a disposed between the fingers 69, which tongue portion controls the feeding of the resistor from the cutting station to the forming station.

Disposed immediately below the forming fingers 69 is an anvil member 70 which is pivotally mounted on a pin 71 carried in the bifurcated lower end of the front guide block 42. As shown best in Figs. 5, 6 and 10, the anvil member 70 is provided at its rear edge with a cavity 72 for receiving the body portion of a resistor 11 which cavity is defined by spaced apart end walls 73 having notches 74 therein for receiving the extending leads of the resistor so that portions of these leads extend outwardly beyond the anvil member 70. As clearly shown in Fig. 6 the anvil member 70 is of such a width as to fit closely within the spaced apart fingers 69 so that when the forming member 32 moves downwardly from the position shown in Fig. 6 to the position shown in Fig. 7 the fingers 69 and the anvil member 70 cooperate to bend the extending ends of the resistor leads to a substantially right angle relation, each of the fingers 69 being provided on its inner surface with a groove 75 for receiving the right angularly bent portions of the resistor leads. The anvil member 70 is also provided with a forwardly extending tail or cam portion 76 adapted to be engaged by a spring pressed plunger 77 mounted in the guide block 42 and normally urged in a downward direction by a spring 78 so that the anvil member 70 is normally held in the position shown in Figs. 5 and 10 in which position it is adapted to receive the leading one of the resistors supplied from the resistor guide track.

As previously indicated the upper cutting knives 67 and 68 extend rearwardly and as shown in Fig. 10, for example, these knives extend beyond the front face of the rear guide plate 43 the lower portion of which, extending from the shoulder 79, is of reduced width so that the upper knives 67 and 68 straddle this reduced portion of the plate 43. While the upper track member 45 abuts against the rear surface of the guide plate 43, it will be seen that the lower track member 46 extends beneath the guide plate 43 substantially to the front surface thereof and this extending portion of track member 46, is cut away to provide a centrally disposed portion 80 on the opposite sides of which are positioned a pair of lower cutting knives 81 and 82 respectively disposed to cooperate with the upper cutting knives 67 and 68. As shown best in Fig. 10, the forward end of each of the cutting knives 81 and 82 is raised to provide a cutting surface 84 which is substantially at the level of the extending leads on the resistors 11 as the resistors are fed from the guide track 44. Consequently the leading one of the resistors 11 being fed from the resistor guide track will be received in the anvil member 70 with the extending leads disposed in the notches 74 thereof, while the second one of the resistors will be positioned between the upper and lower cutting knives so that upon operation of the knives the leads will be trimmed to the proper length as will be described more fully hereinafter.

Supported on the mounting plate 18 on the opposite side of the opening 19 from the above-described cutting and forming stations, and consequently on the opposite side of the board 10 from the forming member 32 and the ejecting member 24 is a reciprocatable clinching member 85 slidably supported in a suitable bearing block 86 and having its lower end pivotally connected by a pin 87 to the upper end of an armature member 88 which forms a part of a conventional solenoid having the usual core structure 89 and an energizing coil 90, the core structure 89 being suitably supported from the mounting plate 18. The upper end of the clinching member 85 comprising an enlarged head 91 provided with a suitably shaped groove 92 in its upper surface which functions as the clinching member, when operated as more fully described hereinafter, to clinch the extending ends of the leads of the resistors as will be more fully described hereinafter.

Having in mind the foregoing description of the apparatus it is believed that a complete understanding of the invention may now be had from a description of the operation. In order to prepare the apparatus for operation, an end portion of the tape 52, containing no resistors, is fed through the slot 58 in the lower track member 46 and over the stripping roll 59 to the take-up reel 60. When the motor 65 is started the belt of resistors will be drawn into the guide track 44 and when the leading resistor reaches the slot 58 the tape will be stripped from the resistor. As the tape continues to move succeeding resistors will be stripped from the tape and the stripped resistors will be pushed along the guide track 44 until the leading resistor is received in the anvil 70, which constitutes part of the forming station, at which time the second resistor will be positioned in the cutting station, i.e., over the lower cutting knives 81 and 82.

Assuming now that a baseboard 10 is properly positioned in the mechanism 14 beneath the cutting and forming stations and that the air motor 20 is energized either by manually closing a suitable starting circuit or automatically under the control of the transfer mechanism 16 as disclosed in the above-referred to Carlzen and Lehner application, the various elements, at the beginning of the stroke, will occupy the relative positions shown in Figs. 6 and 10 with the leading resistor 11' positioned in the anvil 70 and the second resistor 11" (Fig. 10) positioned at the forward edge of the lower cutting knives 81 and 82. Movement of the forming member 32 from the position shown in Figs. 6 and 10 to the position shown in Figs. 7 and 11, will be effective, as shown, to bend the extending ends of the leads on the resistor 11' to the substantially right angular relation shown in which position the right angular portions of the leads occupy the guide grooves 75 in the fingers 69, and it will be observed that the upper cutting knives 67 and 68 have closely approached the lower cutting knives 81 and 82. In this position as clearly shown in Fig. 11 the tongue portion 32a on the forming member 32 has moved between the resistors 11' and 11" so as to insure proper positioning of the resistor 11" during the cutting or lead trimming operation.

In Figs. 8 and 12 the parts are shown in a position wherein the forming member 32 has reached the lower limit of its movement due to the fact that a stop bar 93 (Fig. 5) which forms an integral part of the member 32 has engaged a stop member 94 secured to the inner face of the front guide plate 42, and wherein the ejecting member 24 has begun to move downwardly relative to the forming member 32 against the force of the springs 37. During movement from the position of Figs. 7 and 11 to the position of Figs. 8 and 12 the upper cutting knives move past the lower cutting knives so as to cut to the desired length the conductor leads on the resistor 11" and during the same movement the anvil 70 has been pivotally moved out of the path of the forming member 32 against the force exerted by the spring pressed plunger 77 by reason of the engagement of a portion 95 of the forming member 32 with a sloping cam surface 96 on the anvil. It will further be observed that the outermost ends of the fingers 69 have now closely approached the baseboard 10 which is preferably provided with apertures 97 for receiving the bent ends of the leads on the resistor 11', these apertures being aligned with the guide grooves 75 in the fingers 69. Finally, the ejecting member 24 has moved downwardly to a position in which the body portion of the resistor 11' is received within a recess 98 in the lower end of the ejecting member.

In this position of the various elements the resistor 11' is retained in the forming member 32, even though the anvil 70 has been displaced, by reason of the resiliency of the angularly bent portions of the leads which causes these portions to press outwardly in the grooves 75 and frictionally engage the walls thereof.

The final position of the parts is shown in Figs. 9 and 13, and it will be apparent that during this final stage of the movement the ejecting member 24 continues to move downwardly so as to eject the resistor 11' from the forming member 32, the guide grooves 75 insuring that the right angular portions of the resistor leads enter and extend through the apertures 97 in the board 10. Just before, or just as, the reciprocating motor reaches the end of its downward stroke the arm 26 (Fig. 5) closes the switch 31, and this switch, through suitable circuits which are omitted for purposes of clarity, energizes the coil 90 on the clinching solenoid so as to pull up the armature 88 and move the clinching member 85 to the position shown in Figs. 9 and 12, whereby the head 91 of the clinching member in cooperation with the ejecting member 24 clinches the extending ends of the resistor leads under the board 10. It will be understood, of course, that means other than a solenoid may be employed for operating the clinching member 85 in timed relation with the ejector 24 to effect the clinching operation. For example, a separate air motor may be employed or a mechanical linkage may be provided for operating the clinching member 85 from the air motor 20.

Upon completion of the clinching operation of the air motor 20 is deenergized, or re-energized as the case may be, for operation through a return stroke, and this operation may be effected by any suitable electric switch or air valve adapted to be actuated at the conclusion of the downstroke by the control and stop arm 26, whereupon the various parts return to the respective positions shown in Figs. 6 and 10. During the initial portion of the upward movement of the plunger 22 of the air motor 20, the ejecting member 24 will move independently of the forming member 32. However, shortly after the ejecting member passes the position shown in Figs. 8 and 12, the pin 39 (Fig. 3) will engage the upper end of the slot 38 and thereafter the forming member and the ejecting member will move upwardly as a unit. As the forming member 32 moves from the position shown in Fig. 12 to the position shown in Fig. 11, it will be apparent that the anvil member 70 will be rotated in a clockwise direction under the force exerted by the spring pressed plunger 77, and as soon as the lower edge of the tongue portion 32a in the forming member 32 passes the discharge end of the guide track 44, the previously trimmed resistor 11" will be advanced by the feeding means from the cutting station to the forming station, i.e., onto the anvil member 70 and the next succeeding resistor will be moved onto the cutting knives 81 and 82. Consequently, the apparatus is ready to repeat the above cycle of operations which may be initiated either automatically or manually as desired.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed and desired to be secured by Letters Patent of the United States is:

1. Apparatus for automatically assembling upon a baseboard electric components of the type including a body portion having lead conductors extending outwardly therefrom, said apparatus including an assembly station adapted to receive said baseboards, means for sequentially feeding said components to said station, said station including a cutting station and a forming station disposed in side-by-side relation whereby said forming station receives the leading one and said cutting station receives the second one of said components from said feeding means, and reciprocatable means common to said cutting and forming stations and movable from a retracted to an extended position for cutting to a desired length the leads on said second one of said components and for bending the end portions of the leads on the leading one of said components at substantially a right angle and thereafter displacing said leading component to a position in which said right angular portions extend through a baseboard positioned at said assembly station, said feeding means being effective upon return of said reciprocatable means to said retracted position to advance said second component to said forming station and to advance the next successive component to said cutting station.

2. Apparatus for automatically assembling upon a baseboard electric components of the type including a body portion having lead conductors extending outwardly therefrom, said apparatus including an assembly station adapted to receive said baseboards for assembly of said components thereon, means for feeding said components to said assembly station, said assembly station including a cutting station and a forming station disposed in side-by-side relation whereby said forming station receives the leading one and said cutting station receives the second one of said components from said feeding means, and reciprocatable means common to said cutting and forming station and operable from a normal position to an extended position for cutting the leads on said second one of said components to desired length and for bending at substantially a right angle the end portions of the conductor leads on said leading one of said components, said reciprocable means including ejecting means at said forming station operable upon completion of the lead bending operation for displacing said leading component to a position in which said right angular portions of said leads extend through a baseboard positioned in the path of movement of said ejection means, said feeding means being effective upon return of said reciprocatable means to said normal position to advance said second component from said cutting station to said forming station and to advance the next successive component to said cutting station.

3. Apparatus for automatically assembling upon a baseboard electric components of the type including a body portion having lead conductors extending outwardly therefrom, said apparatus including an assembly station adapted to receive said baseboards for assembly of said components thereon, means for feeding said components to said station, said assembly station including pivoted anvil means disposed adjacent the baseboard in said station and normally positioned to receive the leading one of said components from said feeding means and to support said component with the ends of said leads extending outwardly of said anvil means, reciprocatable forming means at said station cooperating with said anvil means to bend said extending ends of said leads at substantially a right angle and to thereafter pivotally displace said anvil means from said normal position to a position at one side of the path of movement of said forming means, and reciprocatable ejecting means operable upon displacement of said anvil means for moving said component to a position in which said right angular portions of said leads extend through said baseboard, and means operable upon return movement of said forming and ejecting means for returning said anvil means to said normal position for receiving a second one of said components from said feeding means.

4. Apparatus for automatically assembling upon a baseboard electric components of the type including a body portion having lead conductors extending outwardly therefrom, said apparatus including an assembly station adapted to receive said baseboards for assembly of said components thereon, means for feeding said components to said station, said assembly station including pivoted anvil means disposed adjacent the baseboard in said station and normally positioned to receive the leading one of said components from said feeding means and to support said component by its leads with the ends of said leads extending outwardly of said anvil means, reciprocatable forming means at said station cooperating with said anvil means to bend said extending ends of said leads at substantially a right angle and to thereafter pivotally displace said anvil means from said normal position to a position at one side of the path of movement of said forming means, and reciprocatable ejecting means operable upon displacement of said anvil means for moving said component to a position in which said right angular portions of said leads extend through said baseboard, vertically reciprocatable clinching means at said station disposed on the opposite side of said board from said ejecting means and operable in timed relation therewith for clinching the extending ends of said leads to secure said component to said board, and means operable upon return movement of said forming and ejecting means for returning said anvil means to said normal position for receiving a second one of said components from said feeding means.

5. Apparatus for automatically forming and assembling in predetermined position upon a baseboard electric components of the type including a body portion having lead conductors extending outwardly therefrom said apparatus including a forming and assembling station adapted to receive said baseboards, means for feeding said components to said station in sequence, anvil means normally positioned to receive said components from said feeding means and to support said components with the ends of said leads projecting outwardly therefrom, reciprocatable forming means cooperating with said anvil means to bend said projecting leads substantially at a right angle and to thereafter displace said anvil means from the path of movement of said forming means, said forming means including means for retaining said component therein during displacement of said anvil means, ejecting means operable upon displacement of said anvil means for ejecting said component from said forming means and inserting said right angular lead portions through a baseboard positioned in said station, and vertically reciprocatable clinching means at said station disposed on the opposite side of said baseboard from said ejecting means in spaced relationship from said baseboard and operable in timed relation with said ejecting means for clinching the extending ends of said leads against the lower surface of said board.

6. Apparatus for automatically forming and assembling in predetermined position upon a baseboard electric components of the type including a body portion having lead conductors extending outwardly therefrom said apparatus including a forming and assembling station adapted to receive said baseboards, means for feeding said components to said station in sequence, anvil means normally positioned to receive said components from said feeding means and to support said components with the ends of said leads projecting outwardly therefrom, reciprocatable forming means having spaced apart legs for straddling said anvil means to bend said projecting leads at substantially a right angle, said legs having guide grooves therein for receiving the right angularly extending portions of said leads, said forming means including means engageable with said anvil means for displacing said anvil means from the path of movement of said forming means upon completion of the lead bending operation, ejecting means operable upon displacement of said anvil means for ejecting said component from said forming means and inserting said right angular lead portions through a baseboard positioned in said station, said grooves in said legs guiding said component during insertion of said lead portions through said baseboard, and vertically reciprocatable clinching means at said station disposed on the opposite side of said baseboard from said ejecting means and operable in timed relation therewith for clinching the extending ends of said leads to secure said components to said board.

7. A machine for mounting electrical components on a circuit board which comprises a component inserting member for inserting the leads of an electrical component into openings in a circuit board, vertically reciprocatable crimping means for crimping the component leads which project through the circuit board, means for moving the crimping means from a lower rest position and causing them to engage the projecting leads to bend them against the conducting areas of a circuit board, and means actuated by the inserting means reaching a position wherein the leads are inserted into the circuit board for actuating the said moving means.

References Cited in the file of this patent
UNITED STATES PATENTS

| | | |
|---|---|---|
| 409,830 | Daggett | Aug. 27, 1889 |
| 438,712 | Painter | Oct. 21, 1890 |
| 1,313,942 | Elliott | Aug. 26, 1919 |
| 1,625,869 | Plympton | Apr. 26, 1927 |
| 1,859,951 | Blevney | May 24, 1932 |
| 1,982,743 | Kleinschmit et al. | Dec. 4, 1934 |
| 2,139,886 | Drachenberg | Dec. 13, 1938 |
| 2,280,665 | Schmitter | Apr. 21, 1942 |
| 2,281,478 | Chirelstein | Apr. 28, 1942 |
| 2,417,817 | Finn | Mar. 25, 1947 |
| 2,704,844 | Mackechnie | Mar. 29, 1955 |

FOREIGN PATENTS

| | | |
|---|---|---|
| 517,245 | Germany | Feb. 2, 1931 |